US00RE34164E

United States Patent [19]

Misra

[11] E Patent Number: Re. 34,164

[45] **Reissued Date of Patent:* Jan. 19, 1993**

[54] SYNTHETIC HYDROTALCITE

[75] Inventor: Chanakya Misra, Plum Borough, Pa.

[73] Assignee: Aluminum Company of America, Pittsburgh, Pa.

[ * ] Notice: The portion of the term of this patent subsequent to Apr. 7, 2004 has been disclaimed.

[21] Appl. No.: 650,730

[22] Filed: Feb. 4, 1991

Related U.S. Patent Documents

Reissue of:

[64] Patent No.: 4,904,457
Issued: Feb. 27, 1990
Appl. No.: 788,853
Filed: Oct. 18, 1985

U.S. Applications:

[63] Continuation-in-part of Ser. No. 595,374, Mar. 30, 1984, abandoned.

[51] Int. Cl.[5] ..... C01B 31/24; C01F 5/24; C01F 11/18; C01F 7/02

[52] U.S. Cl. ..... 423/115; 423/179; 423/419 P; 423/430; 423/600; 423/630; 424/686

[58] Field of Search ..... 423/115, 129, 419 R, 423/419 P, 430, 431, 432, 600, 630, 631; 424/686, 688, 690, 692

[56] References Cited

U.S. PATENT DOCUMENTS

| | | | |
|---|---|---|---|
| 201,208 | 3/1878 | Lowis | 423/115 |
| 3,320,029 | 5/1967 | Adams | 423/636 |
| 3,539,306 | 11/1970 | Kumara et al. | 424/154 |
| 3,650,704 | 3/1972 | Kumara et al. | 424/154 |
| 3,796,792 | 3/1974 | Miyata et al. | 423/250 |
| 3,879,523 | 4/1975 | Miyata et al. | 423/250 |
| 4,046,855 | 9/1977 | Schepers et al. | 423/600 |
| 4,145,400 | 3/1979 | Adsetts | 423/600 |
| 4,229,309 | 10/1980 | Chews et al. | 252/25 |
| 4,351,814 | 9/1982 | Miyata et al. | 423/306 |
| 4,443,433 | 4/1984 | Knecht et al. | 424/157 |
| 4,447,417 | 5/1984 | Spickett et al. | 423/430 |
| 4,482,542 | 11/1984 | Schneider et al. | 424/157 |
| 4,539,195 | 9/1985 | Schanz et al. | 423/419 B |
| 4,560,545 | 12/1985 | Spickett et al. | 423/430 |
| 4,591,633 | 5/1986 | Suzuki et al. | 528/484 |
| 4,593,343 | 6/1986 | Ross | 361/433 |
| 4,642,193 | 2/1987 | Miyata et al. | 210/682 |
| 4,735,987 | 4/1988 | Morita et al. | 524/436 |
| 4,774,212 | 9/1988 | Drezdon | 502/62 |
| 4,915,930 | 4/1990 | Goheen et al. | 423/112 |

OTHER PUBLICATIONS

"Synthesis of New Hydrotalcite-Like Compunds & Their Physico Chemical Properties . . . ", Chemistry Letters, pp. 843-848, 1973.

The System $MgO—Al_2O_3—H_2O$ & The Influence of Carbonate and Nitrate Ions on the Phase Equilibria, American Journal of Science, vol. 251, pp. 337-361, May 1953.

Hand Book of Chemical Synonyms & Trade Names, 1978, p. 365.

Properties of a Synthetic Magnesium Aluminum Carbonate Hydroxide and its Relationship to Magnesium Aluminum Double Hydroxide Manasseite and Hydrotalcite, The American Mineralogist, vol. 52, Jul., Aug. 1967.

Physico-Chemical Properties of Synthetic Hydrotalcites in Relation to Composition Clay and Clay Minerals, vol. 28, #1, pp. 50-56, 1980.

The Syntheses of Hydrotalcite-like Compouds & Their Structures & Physico Chemical Properties, Clay & Clay Minerals, vol. 23, pp. 369-375, 1975.

Neoformation of Hydrotalcite Due to Industrial Inputs in Marine Sediments, American Mineralogist, vol. 62, pp. 1173-1179, 1977, Stoffyn et al.

"Synthesis of Hydrotalcite-Like Compounds & Their Physicochemical Properties . . . ", Clay & Clay Minerals, vol. 25, pp. 14-18, 1977.

*Primary Examiner*—Gary P. Straub

*Attorney, Agent, or Firm*—Gary P. Topolosky

[57] ABSTRACT

Disclosed is a method for producing hydrotalcite in high yield including reacting activated magnesia with an aqueous solution containing aluminate, carbonate, and hydroxyl ions. The [method further includes a first step of] *activated magnesia is produced by* heating magnesium carbonate or magnesium hydroxide to a temperature between about 500°-900° C. [to form activated magnesia or magnesium oxide.] The method is suited to producing synthetic hydrotalcite from industrial Bayer liquor.

35 Claims, 3 Drawing Sheets

SYNTHETIC HYDROTALCITE

POWDER X-RAY DIFFRACTION
SYNTHETIC HYDROTALCITE

DIFFERENTIAL THERMAL ANALYSIS
FOR SYNTHETIC HYDROTALCITE

SYNTHETIC HYDROTALCITE
(5000 X)

SYNTHETIC HYDROTALCITE

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of U.S. patent application Ser. No. 595,374, filed Mar. 30, 1984, now abandoned.

BACKGROUND OF THE INVENTION

This invention relates to a method for producing synthetic hydrotalcite.

Hydrotalcite is a naturally occurring mineral having the formula 6 $MgO.Al_2O_3.CO_2.12\ H_2O$ or $Mg_6Al_2.(OH)_{16}CO_3.4\ H_2O$. Known deposits of natural hydrotalcite are very limited and total only about 2,000 or 3,000 tons in the whole world. Natural hydrotalcite has been found in Snarum, Norway and in the Ural Mountains. Typical occurrences are in the form of serpentines, in talc schists, and as an alteration product of spinel where, in some cases, hydrotalcite has formed as pseudomorphs after spinel.

The upper stability temperature of hydrotalcite is lower than the lower limit for spinel. Spinel and hydrotalcite theoretically never would appear together in stable condition. If equilibrium has been established, the spinel would be completely changed to hydrotalcite. However, naturally occurring hydrotalcite is intermeshed with spinel and other materials.

Natural hydrotalcite is not present as pure product and always contains other minerals such as penninite and muscovite and potentially undesirable minerals such as heavy metals. Conventional practice recognizes that it is practically impossible to remove such impurities from a natural hydrotalcite.

Previous attempts to synthesize hydrotalcite have included adding dry ice or ammonium carbonate (a) to a mixture of magnesium oxide and alpha-alumina or (b) to a thermal decomposition product from a mixture of magnesium nitrate and aluminum nitrate and thereafter maintaining the system at temperatures below 325° C. at elevated pressures of 2,000–20,000 psi. Such a process is not practical for industrial scale production of synthetic hydrotalcite by reason of the high pressures. Furthermore, the high pressure process forms substances other than hydrotalcite, such as brucite, boehmite, diaspore, and hydromagnesite.

Ross and Kodama have reported a synthetic mineral prepared by titrating a mixed solution of $MgCl_2$ and $AlCl_3$ with NaOH in a $CO_2$ free system and then dialyzing the suspension for 30 days at 60° C. to form a hydrated Mg-Al carbonate hydroxide. The mineral product has been associated with the formula $Mg_6Al_2CO_3.(OH)_{16}.4\ H_2O$ while having the properties of manasseite and hydrotalcite. X-ray diffraction powder patterns have indicated that the mineral more closely resembles manasseite than hydrotalcite, while the differential thermal analysis curve of the precipitate has been characterized as similar to that given for hydrotalcite.

Kerchle, U.S. Pat. No. 4,458,026, discloses a preparation of Mg/Al/carbonate hydrotalcite which involves the addition of mixed magnesium/aluminum nitrates, sulphates or chlorides as an aqueous solution to a solution of a stoichiometric amount of sodium hydroxide and carbonate at about 25°–35° C. with stirring over a several-hour period producing a slurry. The slurry is then heated for about 18 hours at about 50°–200° C. (preferably 60°–75° C.) to allow a limited amount of crystallization to take place. After filtering the solids, and washing and drying, the dry solids are recovered.

Kumura et al. U.S. Pat. No. 3,650,704, reports a synthetic hydrotalcite preparation by adding an aqueous solution of aluminum sulfate and sodium carbonate to a suspension of magnesium hydroxide. The suspension then can be washed with water until the presence of sulfate radical becomes no longer observable. The suspension is heated at 85° C. for three hours and dried. The magnesium component starting material is reported as any member of the group consisting of magnesium oxide, magnesium hydroxide, magnesium carbonate, and water-soluble magnesium salts, e.g., such as mineral acid salts including magnesium chloride, magnesium nitrate, magnesium sulfate, magnesium dicarbonate, and bittern.

It is an object of the present invention to produce synthetic hydrotalcite in high purity.

It is another object of this invention to produce hydrotalcite in high yield at atmospheric pressure.

SUMMARY OF THE INVENTION

The present invention includes a method for producing hydrotalcite including reacting an activated magnesia with an aqueous solution of aluminate, carbonate, and hydroxyl ions. The method can be carried out at atmospheric pressure to form hydrotalcite in high purity and high yield. Activated magnesia is formed by heating a magnesium compound such as magnesium carbonate or magnesium hydroxide to a temperature between about 500°–900° C.

DETAILED DESCRIPTION

The present invention produces synthetic hydrotalcite by reacting activated magnesia with an aqueous solution of aluminate, carbonate, and hydroxyl ions. The magnesia must be activated to produce hydrotalcite in high purity. Otherwise, i.e., in the event that an unactivated magnesia is used, the resulting product will include substantial amounts of mineral forms other than hydrotalcite.

The activated magnesia can be formed by activating magnesium compounds such as magnesium carbonate, or magnesium hydroxide at temperatures of between about 500°–900° C. Below 500° C., the magnesium salt will not activate sufficiently and will contain inhibiting amounts of the starting material. Above 900° C., the resulting magnesium oxide takes on a form which is insufficiently active. The insufficiently active magnesia could be characterized as dead burnt. Such a form of magnesia will not form hydrotalcite predominantly over other mineral forms. The insufficiently active form of magnesia which is nonspecific to forming hydrotalcite will be avoided by heating the magnesium salt starting materials to elevated activating temperatures, but which must not exceed about 900° C., to form the activated magnesia or magnesium oxide (MgO).

The activated magnesium oxide is added to a solution containing ions of aluminate, carbonate, and hydroxl. Preferably the activated magnesium oxide is added to an aqueous solution having a pH above about 13. For example, a suitable solution may contain alkali hydroxide, alkali carbonate, and aluminum oxide. Industrial Bayer process liquor used for the production of alumina from bauxite is a suitable solution containing sodium hydroxide, sodium carbonate, and aluminate ions. A Bayer process liquor containing excess alumina also is suitable.

By way of example, 5–25 grams per liter of activated MgO can be added to 120–250 g/l NaOH (expressed as $Na_2CO_3$), 20–100 g/l $Na_2CO_3$, and 50–150 g/l $Al_2O_3$ in an aqueous solution. The mixture should be agitated at a temperature of about 80°–100° C. for 20–120 minutes.

It has been found that magnesium compounds other than the activated magnesia of the present invention produce less than desirable results. For example, $MgSO_4$, $MgCl_2$, or $MgNO_3$ added to Bayer liquor yields $Mg(OH)_2$ and $Al(OH)_3$. Similarly, $Mg(OH_2$ added to Bayer liquor remains mostly unreacted.

The process of the present invention produces hydrotalcite in high yield. By high yield is meant a conversion yield greater than about 75% and preferably greater than about 90%.

Figure 1:
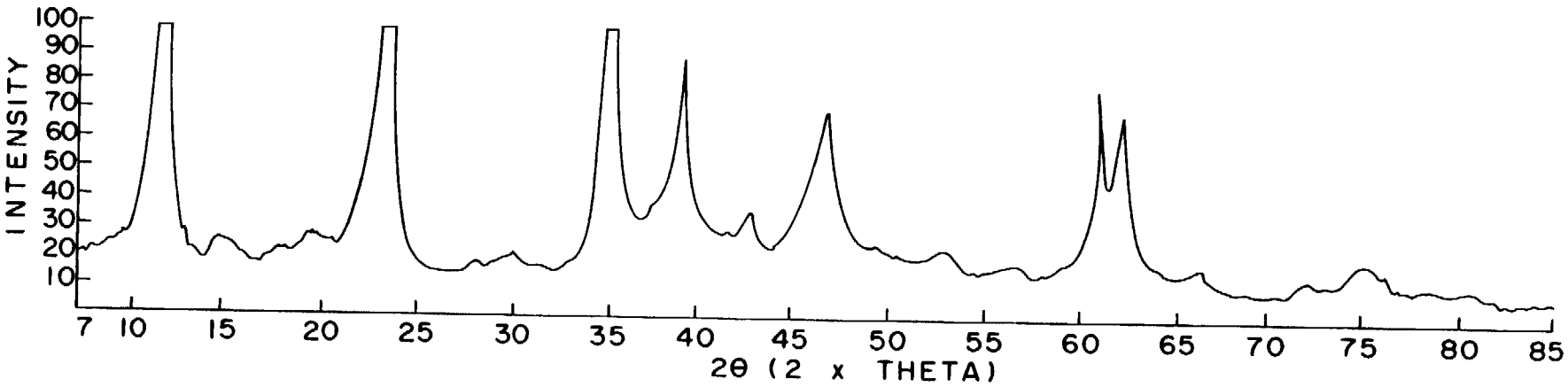
FIG. 1 is a graphical depiction of a powder X-ray diffraction pattern obtained from synthetic hydrotalcite produced by the method of the present invention.

The mineral produced by the method of the present invention can be analyzed by powder X-ray diffraction. The product formed by Example 2 of this specification was analyzed in powder form in a Siemens X-ray diffractometer having Model No. D-500 supplied by Siemens AG (W. Germany). The resulting X-ray diffraction pattern is depicted in FIG. 1. The diffraction pattern indicates that the product is hydrotalcite at high purity. The dÅ spacing obtained by X-ray diffraction is shown in Table I for the mineral obtained from the method of Example 2 and is compared to (1) the ASTM standard for hydrotalcite and (2) natural hydrotalcite as reported by Roy et al. American Journal of Science, Vol. 251, at page 353. By these indications, the process of the present invention produces hydrotalcite in high purity.

High purity in the context of the present invention is established by the absence of diffraction lines attributable to compounds other than hydrotalcite. The absence of diffraction lines indicates that such other compounds are not present in any significant amount. By way of contrasting example, the material produced in Example 1 described hereinbelow using a non-activated magnesium oxide contains lines or peaks indicating the presence of compounds other than hydrotalcite. These lines are observed in the data in Table I for the dÅ spacing of the product from Example 1.

TABLE I

X-RAY DIFFRACTION

| ASTM (22-700) | | Natural Hydrotalcite (Snarum, Norway) | | Example 1 | | Example 2 | |
|---|---|---|---|---|---|---|---|
| dÅ | I/I Max. | dÅ | I/I Max. | dÅ | I/I Max. | dÅ | I/I Max. |
| 7.84 | 100 | 7.63 | 100 | 12.4676 | 4.3 | 8.8729 | 3.7 |
| 3.90 | 60 | 3.82 | 50 | 12.3128 | 4.8 | 7.7348 | 99.2 |
| 2.60 | 40 | 2.56 | 10 | 12.1094 | 4.2 | 7.6746 | 100.0 |
| 2.33 | 25 | 2.283 | 5 | 11.8579 | 5.5 | 6.0944 | 5.0 |
| 1.990 | 30 | 1.941 | 10 | 11.5907 | 4.2 | 6.0194 | 4.7 |
| 1.950 | 6 | 1.524 | 5 | 11.3070 | 4.7 | 5.9257 | 5.9 |
| 1.541 | 35 | 1.495 | 5 | 11.1268 | 4.2 | 4.0786 | 8.6 |
| 1.498 | 25 | | | 10.9421 | 4.2 | 3.9498 | 30.0 |
| 1.419 | 8 | | | 10.5889 | 4.1 | 3.8387 | 60.9 |
| 1.302 | 6 | | | 4.7678 | 45.7 | 3.8192 | 64.5 |
| 1.265 | 10 | | | 4.6131 | 6.9 | 2.6644 | 4.0 |
| 1.172 | 2 | | | 4.5742 | 6.0 | 2.5765 | 80.1 |
| 0.994 | 4 | | | 4.5429 | 3.9 | 2.5204 | 25.2 |
| 0.976 | 6 | | | 4.5093 | 5.3 | 2.5102 | 21.7 |
| | | | | 4.4645 | 4.9 | 2.4960 | 14.9 |
| | | | | 4.4154 | 3.3 | 2.4840 | 13.0 |
| | | | | 4.3161 | 3.3 | 2.4643 | 10.8 |
| | | | | 4.2944 | 3.0 | 2.4526 | 11.4 |
| | | | | 4.2552 | 3.2 | 2.4364 | 10.0 |
| | | | | 4.2163 | 5.9 | 2.0677 | 3.7 |
| | | | | 4.1814 | 5.4 | 2.0530 | 5.7 |
| | | | | 4.1349 | 7.4 | 2.0477 | 3.3 |
| | | | | 4.1009 | 6.9 | 2.0467 | 3.9 |
| | | | | 4.0676 | 9.7 | 2.0401 | 4.9 |
| | | | | 3.9759 | 13.9 | 2.0318 | 7.4 |
| | | | | 2.7284 | 5.4 | 2.0221 | 6.7 |
| | | | | 2.6458 | 4.1 | 2.0191 | 6.6 |
| | | | | 2.5774 | 30.4 | 2.0041 | 12.4 |
| | | | | 2.4920 | 7.3 | 1.9976 | 10.3 |
| | | | | 2.4800 | 6.6 | 1.5239 | 38.8 |
| | | | | 2.4660 | 8.0 | 1.5115 | 18.4 |
| | | | | 2.4372 | 19.9 | 1.4963 | 34.1 |
| | | | | 2.3703 | 100.0 | 1.3209 | 2.0 |
| | | | | 2.3191 | 15.5 | 1.3180 | 2.8 |
| | | | | 2.2869 | 17.1 | 1.3161 | 4.1 |
| | | | | 1.9616 | 5.2 | 1.3114 | 4.1 |
| | | | | 1.9465 | 9.7 | 1.3099 | 3.3 |
| | | | | 1.9372 | 8.3 | 1.2771 | 4.1 |
| | | | | 1.9302 | 8.2 | 1.2722 | 5.2 |
| | | | | 1.9244 | 7.3 | 1.2692 | 4.3 |
| | | | | 1.8194 | 5.0 | 1.2689 | 5.6 |
| | | | | 1.7953 | 27.1 | 1.2662 | 6.8 |
| | | | | 1.5740 | 29.2 | 1.2632 | 4.1 |
| | | | | 1.5614 | 3.0 | | |
| | | | | 1.5557 | 4.2 | | |
| | | | | 1.5347 | 4.7 | | |
| | | | | 1.5225 | 18.2 | | |
| | | | | 1.5102 | 7.9 | | |
| | | | | 1.4918 | 87.7 | | |
| | | | | 1.3745 | 4.9 | | |
| | | | | 1.3719 | 5.2 | | |
| | | | | 1.3692 | 3.0 | | |
| | | | | 1.3176 | 2.2 | | |
| | | | | 1.3121 | 7.8 | | |
| | | | | 1.3089 | 8.4 | | |

Figure 2:
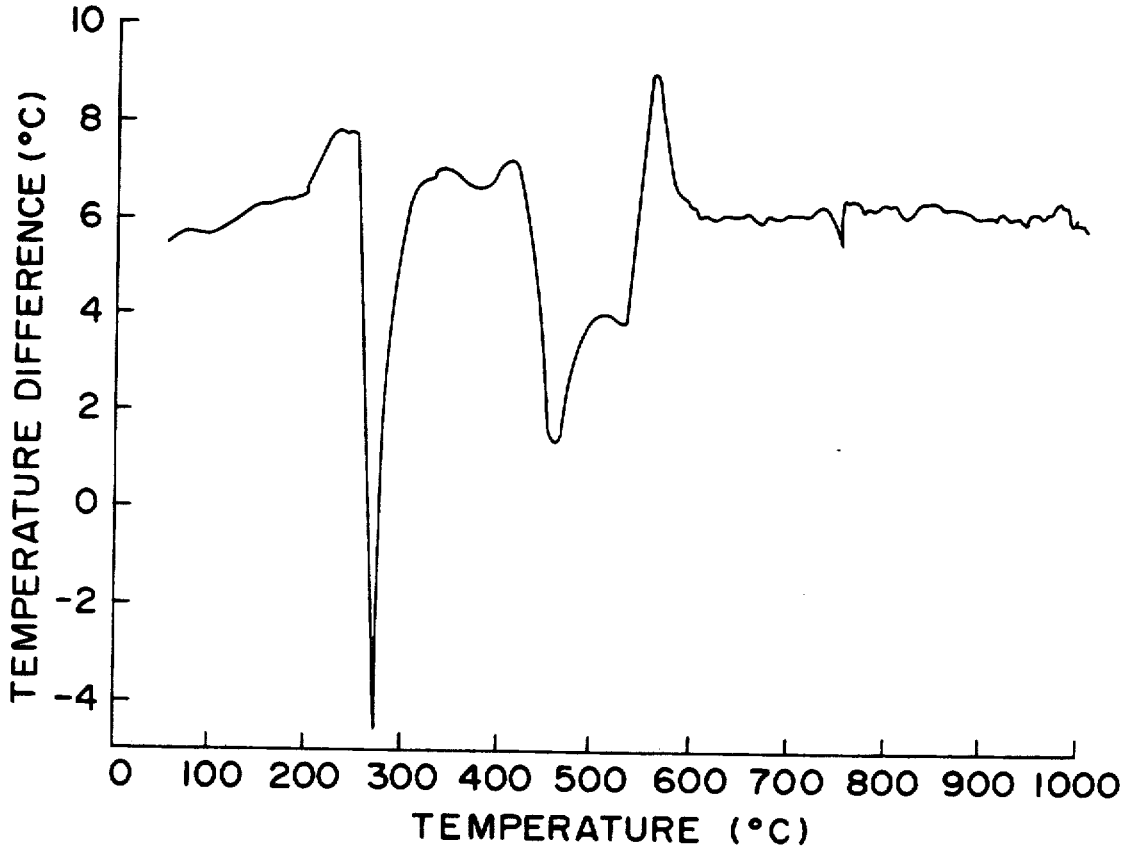
FIG. 2 is a graphical depiction of the differential thermal analysis of synthetic hydrotalcite obtained by the method of the present invention.

The product of Example 2 was analyzed by differential thermal analysis (DTA). FIG. 2 presents a graphical illustration of the DTA for the product of Example 2 which represents hydrotalcite in a high purity.

Figure 3:
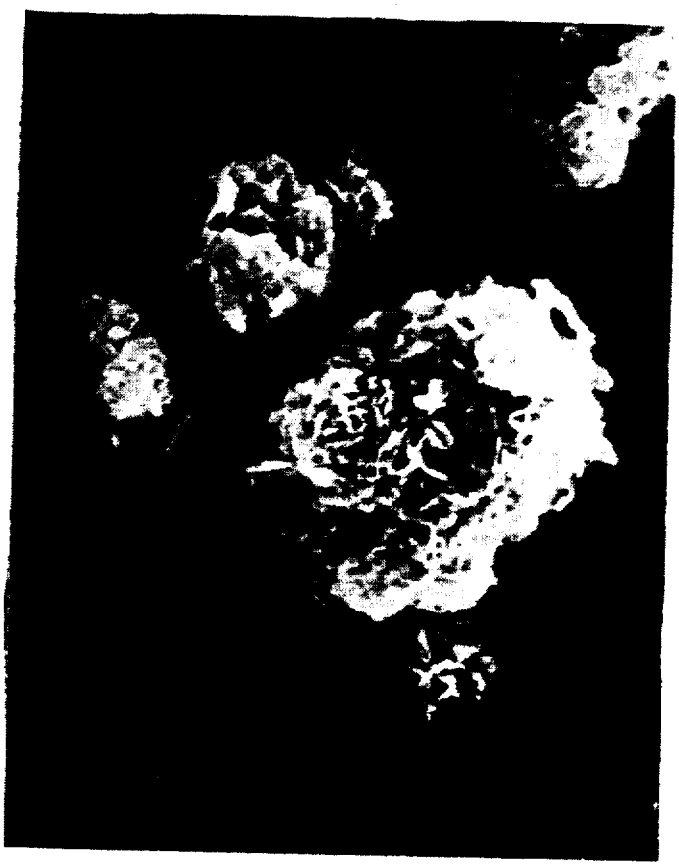
FIG. 3 is a photographic representation of synthetic hydrotalcite obtained by the method of the present invention.

The synthetic hydrotalcite produced by the present invention is a highly porous mineral. A photograph by scanning electron micrograph was taken of the product of the process carried out in Example 2 and is presented as FIG. 3. The photograph illustrates the mineral product at a 5,000X magnification. The mineral can be seen to have a high surface area and high porosity.

Synthetic hydrotalcite produced by the process of the present invention has utility in one aspect in purification applications such as a filter aid. The synthetic hydrotalcite is adaptable in other aspects as a fire retardant material which releases water and $CO_2$ on heating. Other applications include a filler material for paper or as a drying, bleaching, or absorbent material after activation by heating to over about 500° C. Synthetic hydrotalcite produced by the process of the present invention also is useful in purification and catalytic applications by virtue of an anion exchange capability wherein carbonate anion can be replaced with other anions without destroying the structure of the compound.

EXAMPLE 1

Magnesium carbonate in an amount of 25 grams was heated to about 1,100° C. for about 45 minutes and allowed to cool. The resulting magnesium oxide was added to a Bayer liquor prepared by digesting Suriname bauxite in a ratio of about 0.65 (defined as $Al_2O_3$/caustic expressed as $Na_2CO_3$, as used in industrial practice) at blow off and then filtered. One liter of Bayer liquor was heated to about 95° C. Ten grams of the magnesium compound treated at 1,100° C. were added. The mixture was agitated for one-half hour and then filtered. The residue was washed and dried at 105° C. overnight.

The resulting product weighed about 16.7 grams which indicates a yield of less than 67%. The product of this Example 1 was analyzed by powder X-ray diffraction and was found to contain predominant amounts of $Mg(OH)_2$ and MgO.

EXAMPLE 2

Activated magnesia was produced by heating 25 grams magnesium carbonate to about 600° C. for 45 minutes. The heating period of 45 minutes was selected to facilitate complete activation. For varying amounts and temperatures, the heating period should be adjusted to achieve an active product. Typical heating periods will range from about 30 to about 120 minutes.

Ten grams of the activated MgO were added to one liter of the same Bayer liquor used in Example 1. The mixture was heated to about 95° C. and agitated for about one-half hour. The mixture was filtered, and the residue was washed and dried at 105° C. overnight. The resulting precipitate had a white appearance, weighed about 22.5 grams, and had a refractive index of 1.50. The precipitate was a fine, free-flowing crystalline powder insoluble in water and organic solvents.

The precipitate was analyzed by powder X-ray diffraction and found to be hydrotalcite in high purity.

The 22.5 grams compares to a theoretical yield of 24.95 grams and indicates a high yield conversion of over 90%.

What is claimed is:

1. A method of producing hydrotalcite, comprising:
(a) heating magnesium carbonate or magnesium hydroxide to a temperature between about 500°-900° C. to form activated magnesia; and
(b) reacting activated magnesia with an aqueous solution of aluminate, carbonate, and hydroxyl ions at a pH above about 13 to form hydrotalcite at a conversion yield greater than about 75%.

2. A method as set forth in claim 1 wherein said solution comprises a Bayer liquor.

3. A method as set forth in claim 1 wherein said reacting includes heating to a temperature of at least about 80° C. at ambient pressure.

4. A method as set forth in claim 1, said first step comprising heating magnesium carbonate or magnesium hydroxide to a temperature between about 550°-650° C. to form said activated magnesia.

5. A method as set forth in claim 4 wherein said magnesium carbonate or magnesium hydroxide is heated to a temperature between about 550°-650° C. for a period of about 30 to 120 minutes.

6. A method as set forth in claim 1 wherein said aqueous solution containing ions of aluminate, carbonate, and hydroxyl comprises about 120-250 grams/liter NaOH (expressed as $Na_2CO_3$), about 20-100 grams/liter $NaCO_3$, and about 50-150 grams/liter $Al_2O_3$.

7. A method as set forth in claim 6 wherein about 5-25 grams/liter activated magnesia is added to said aqueous solution.

8. A method of producing a material having a powder X-ray diffraction pattern of the mineral hydrotalcite comprising:
(a) heating magnesium carbonate or magnesium hydroxide to a temperature between about 500°-900° C. to form activated magnesia; and
(b) reacting said activated magnesia with an aqueous solution of aluminate, carbonate, and hydroxyl ions at a pH above 13 to from hydrotalcite at a conversion yield greater than about 75%.

9. A method as set forth in claim 8 wherein said aqueous solution comprises an industrial Bayer liquor.

10. A method as set forth in claim 9 wherein said reacting comprises heating to a temperature of at least about 80° C. at atmospheric pressure.

11. A method as set forth in claim 10 said first step comprising heating magnesium carbonate or magnesium hydroxide to a temperature between about 550°-650°C. to form said activated magnesia.

12. A method as set forth in claim 11 further comprising recovering said hydrotalcite in dried form.

*13. A method of producing hydrotalcite comprising:*
*reacting activated magnesia produced by heating magnesium carbonate or magnesium hydroxide to between about 500°-900° C. with an aqueous solution containing aluminate, carbonate and hydroxyl ions at a pH above about 13 to form hydrotalcite at a conversion yield greater than about 75%.*

*14. A method as set forth in claim 13 wherein said solution comprises a Bayer liquor.*

*15. A method as set forth in claim 13 wherein said reacting includes heating to a temperature of at least about 80° C. at ambient pressure.*

*16. A method as set forth in claim 13 wherein said magnesium carbonate or magnesium hydroxide is produced by heating to a temperature between about 550°-650° C. to form said activated magnesia.*

*17. A method as set forth in claim 16 wherein said magnesium carbonate or magnesium hydroxide is produced by heating to a temperature between about 550°-650° C. for a period of about 30 to 120 minutes.*

*18. A method of producing a material having a powder X-ray diffraction pattern containing the mineral hydrotalcite comprising:*
*reacting activated magnesia produced by heating magnesium carbonate or magnesium hydroxide to a temperature between about 500°-900°C.* with an aqueous solution of aluminate, carbonate, and hydroxyl ions at a pH above about 13 to form hydrotalcite at a conversion yield greater than about 75%.

*19. A method as set forth in claim 18 wherein said aqueous solution comprises an industrial Bayer liquor.*

*20. A method as set forth in claim 19 wherein said reacting comprises heating to a temperature of at least about 80° C. at atmospheric pressure.*

*21. A method as set forth in claim 20 wherein said magnesium carbonate or magnesium hydroxide is produced by heating to a temperature between about 550°–650° C. to form said activated magnesia.*

*22. A method as set forth in claim 18 further comprising recovering said hydrotalcite in dried form.*

*23. A method of producing hydrotalcite comprising reacting activated magnesia produced by heating magnesium carbonate or magnesium hydroxide to between about 500° and 900° C. with an aqueous solution containing aluminate, carbonate and hydroxyl ions to form hydrotalcite at a conversion yield greater than about 75%.*

*24. A method as set forth in claim 23 wherein about 5-25 grams of activated magnesia is added per liter of aqueous solution to said aqueous solution.*

*25. A method as set forth in claim 23 wherein said aqueous solution containing ions of aluminate, carbonate and hydroxyl ions comprises about 120 to 250 grams per liter of NaOH (expressed as $Na_2CO_3$).*

*26. A method as set forth in claim 23 wherein said aqueous solution containing ions of aluminate, carbonate and hydroxyl ions comprises about 20 to 100 grams per liter of $Na_2CO_3$.*

*27. A method as set forth in claim 23 wherein said aqueous solution containing ions of aluminate, carbonate and hydroxyl ions comprises about 50 to 150 grams per liter of $Al_2O_3$.*

*28. A method as set forth in claim 23 wherein said aqueous solution containing ions of aluminate, carbonate and hydroxyl ions comprises about 120 to 250 grams per liter of NaOH (expressed as $Na_2CO_3$) and about 20 to 100 grams per liter of $Na_2CO_3$.*

*29. A method as set forth in claim 23 wherein said aqueous solution containing ions of aluminate, carbonate and hydroxyl ions comprises about 20 to 100 grams per liter of $Na_2CO_3$ about 50 to 150 grams per liter of $Al_2O_3$.*

*30. A method as set forth in claim 23 wherein said aqueous solution containing ions of aluminate, carbonate and hydroxyl ions comprises about 120 to 250 grams per liter of NaOH (expressed as $Na_2CO_3$) and about 50 to 150 grams per liter of $Al_2O_3$.*

*31. A method as set forth in claim 23 wherein said aqueous solution containing ions of aluminate, carbonate and hydroxyl ions comprises about 120 to 250 grams per liter of NaOH (expressed as $Na_2CO_3$), about 20 to 100 grams per liter of $Na_2CO_3$ about 50 to 150 grams per liter of $Al_2O_3$.*

*32. A method as set forth in claim 23 wherein said aqueous solution containing ions of aluminate, carbonate and hydroxyl ions comprises up to about 100 grams per liter of $Na_2CO_3$.*

*33. A method as set forth in claim 23 wherein said aqueous solution containing ions of aluminate, carbonate and hydroxyl ions comprises up to about 150 grams per liter of $Al_2O_3$.*

*34. A method as set forth in claim 23 wherein said aqueous solution containing ions of aluminate, carbonate and hydroxyl ions comprises up to about 250 grams per liter of NaOH.*

*35. A method as set forth in claim 23 wherein at least 5 grams of activated magnesia is added per liter of said aqueous solution.*

* * * * *

UNITED STATES PATENT AND TRADEMARK OFFICE

CERTIFICATE OF CORRECTION

PATENT NO. : Re. 34,164

DATED : January 19, 1993

INVENTOR(S) : Chanakya Misra

It is certified that error appears in the above-identified patent and that said Letters Patent is hereby corrected as shown below:

TITLE PAGE:

| | |
|---|---|
| Under "References Cited--OTHER PUBLICATIONS", 6th publication down, starting "The Syntheses of Hydrotalcite-like..." | Change "Compouds" to --Compounds-- |
| Col. 3, line 31 | After "Similarly", change "$Mg(OH_2$" to --$Mg(OH)_2$-- |
| Col. 6, line 24, Claim 8 | After "above", insert --about-- |
| Col. 8, line 6, Claim 29 | After "$Na_2CO_3$", insert --and-- |
| Col. 8, line 16, Claim 31 | After "$Na_2CO_3$", insert --and-- |

Signed and Sealed this

Twenty-third Day of November, 1993

*Attest:*

*Attesting Officer*

Bruce Lehman

BRUCE LEHMAN

*Commissioner of Patents and Trademarks*